United States Patent [19]

Sauer

[11] 4,441,630
[45] Apr. 10, 1984

[54] ROTARY HEAD TRAY DROPPER

[76] Inventor: Robert L. Sauer, 5826 W. Glenn Dr., Maple Heights, Ohio 44137

[21] Appl. No.: 258,416

[22] Filed: Apr. 28, 1981

[51] Int. Cl.³ .................................................. B65G 59/06
[52] U.S. Cl. ...................................... 221/297; 221/241
[58] Field of Search .......................... 221/222, 241, 297

[56] References Cited

U.S. PATENT DOCUMENTS

| 1,864,422 | 6/1932 | Flook | 221/297 |
| 2,721,002 | 10/1955 | Smith | 221/222 |
| 3,426,941 | 2/1969 | Hovekamp | 221/241 X |

FOREIGN PATENT DOCUMENTS 935833  9/1963  United Kingdom ................ 221/297

Primary Examiner—F. J. Bartuska
Attorney, Agent, or Firm—Pearne, Gordon, Sessions, McCoy, Granger & Tilberry

[57] ABSTRACT

A gravity feed rotary head tray dropper is provided which may be universally adjusted for different tray sizes, shapes and lip thicknesses. The device includes a rotatable blade to separate the bottom tray from a stack of trays and a rotatable tray support disc to hold the stack of trays in position between tray separations. The rotatable tray support disc is positioned beneath the rotatable blade and is vertically adjustable to accommodate tray lips of varying thicknesses.

9 Claims, 13 Drawing Figures

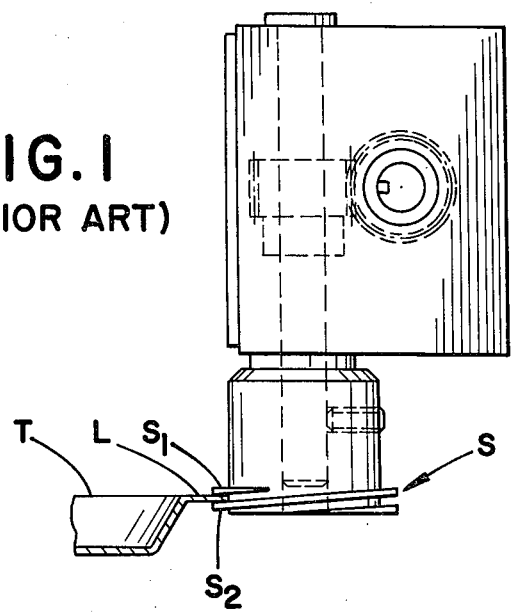
FIG. I
(PRIOR ART)
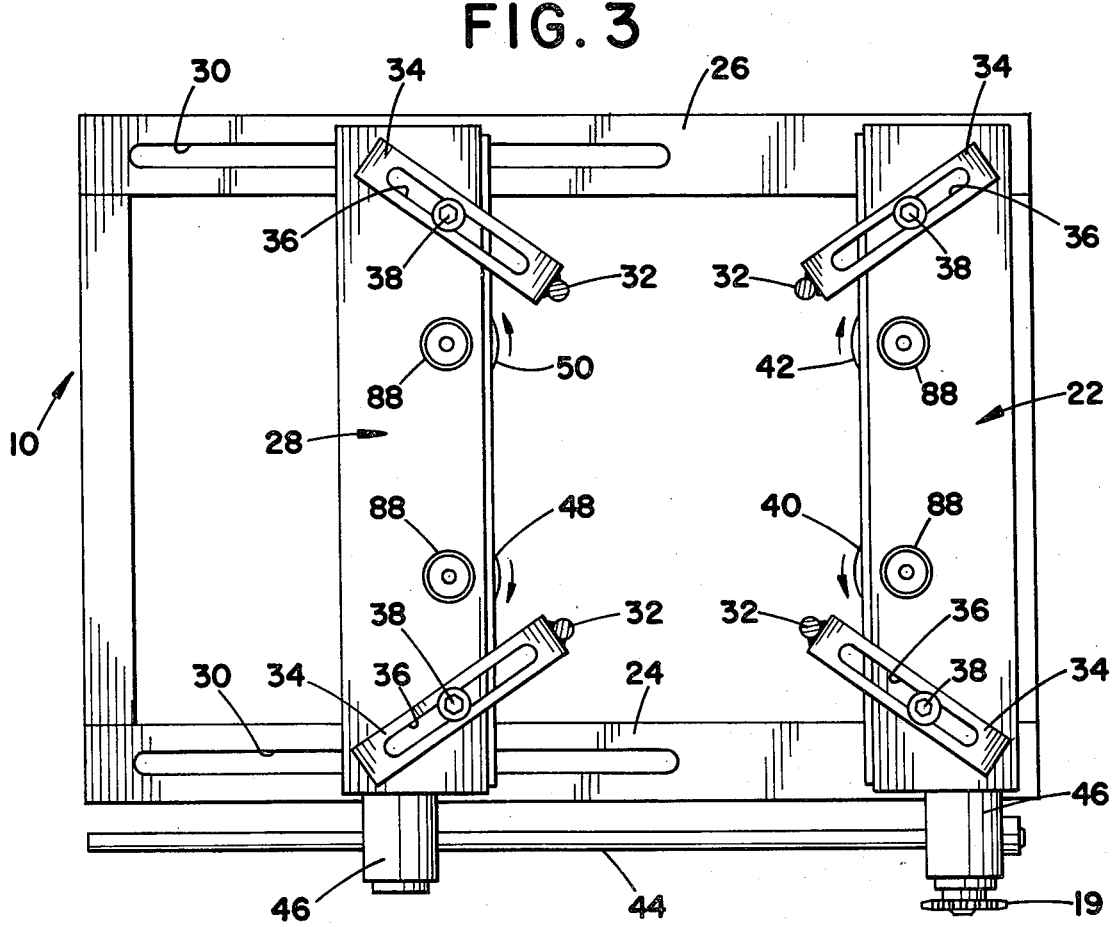
FIG. 3

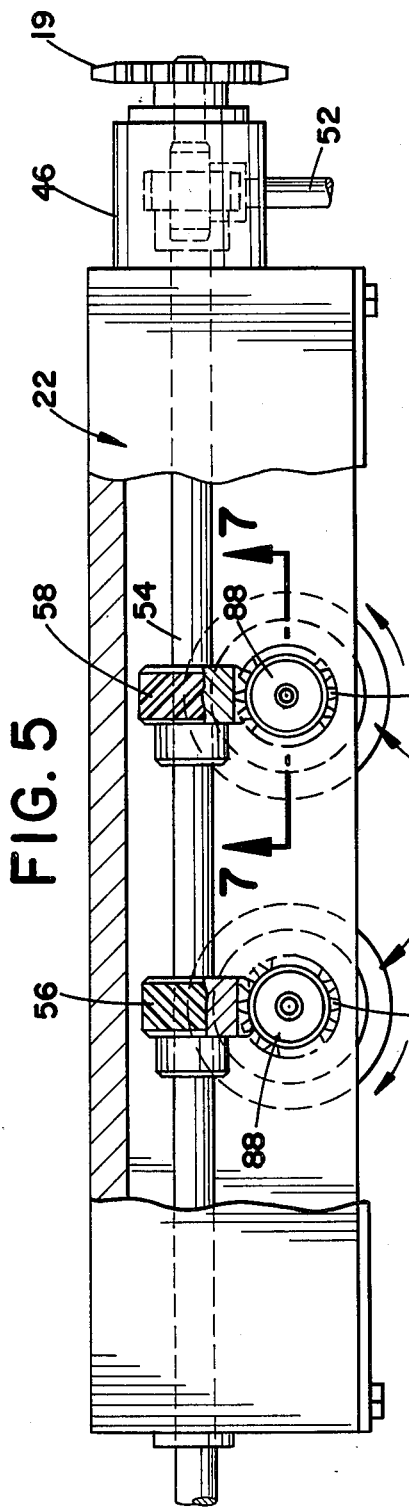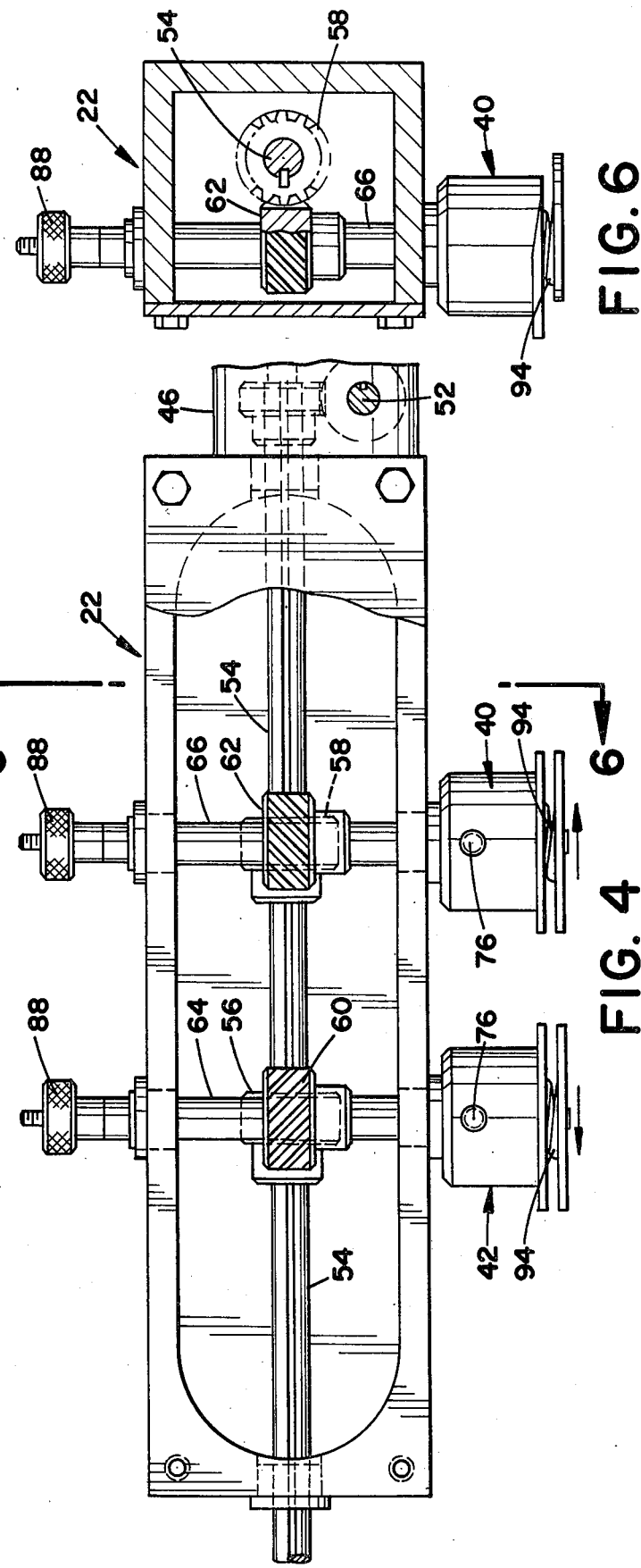

ROTARY HEAD TRAY DROPPER

BACKGROUND OF THE INVENTION

This invention relates to gravity feed tray droppers having rotary head tray dispensers. More specifically, this invention relates to a gravity feed tray dropper which may be quickly and accurately adjusted to any size, shape or lip thickness of trays whether the trays be paper, plastic or metal. The invention has particular utility in dispensing trays such as used in the frozen food packaging industry and will be described in this context.

Trays of frozen foods, such as vegetables, sauces, meat dishes, baked goods, pastries, and almost every other variety of food which is susceptible to pre-cooking and freezing is now customarily packaged in shallow draft trays, having perimeter flanges or lips, which can be stacked and fed either singularly or in multiples onto a food conveyor where the trays are filled and sealed. Because trays are made from various materials, and are made in virtually unlimited numbers of shapes and sizes, including circular, rectangular, and all variations inbetween, there has been a long felt need for a tray dropper which does not require a different dispensing head for each different size of tray.

Heretofore, rotary dispensing heads have been of the screw type, such as shown in prior art FIG. 1, wherein a screw thread S grips the lip L of a tray T between helical flights S1 and S2. It will be readily appreciated that the number of lip thicknesses which can be accommodated between flights of a particular screw thread is extremely limited. Accordingly, in order to change over from one type of tray to another type of tray, having a different lip thickness, it has been necessary to substitute a dispensing head having a screw thread of a different pitch. This, of course, requires that a wide range of dispensing heads be maintained in stock for changing over from one size tray to another size tray, and also involves considerable labor and down time in making these change overs. Additionally, it has been known for set-up men to wedge the flights of the helical screw threads apart or to hammer them together in order to avoid the down time required to replace the dispensing heads. This has resulted in uneven results, erratic dispensing and has been another cost factor in the utilization of this type of tray dropper.

BRIEF DESCRIPTION OF THE INVENTION

The subject invention is designed to avoid the problems encountered in the prior art with screw thread type tray droppers. In addition to providing a tray stacking mechanism which is universally adjustable to any size or shape of tray, the screw type dispensing head has been eliminated and replaced with a novel dispensing head. This improved head is instantly adjustable to any lip thickness of any type tray now used in the food processing industry. Instead of relying on a screw thread, which is not adjustable, the subject invention utilizes rotatable discs to support the undersides of the lips of the bottom tray of a stack of trays through a predetermined arc of rotation. Thereafter, tray separating blades, spaced above the lower supporting discs, are adapted to engage the undersides of the lips of a tray second from the bottom of the stack of trays. The tray separating blade holds the stack in place but permits the bottom tray to fall by gravity away from the stack. Thereafter, the tray must be intercepted and guided onto a conveyor by means well known to those skilled in the art, and not a portion of this invention. When the stack has been run out and it is desired to run a different size tray, the tray dropper can be adjusted within a matter of a few seconds by turning easily accessible manual adjustment knobs. These adjustments can be quickly made at any time as required and by an unskilled operator.

It is therefore among the objects of this invention to provide a tray dropper which: can receive and dispense an unlimited number of sizes and shapes of trays; can be quickly adjustable by unskilled labor; does not rely on screw thread type dispenser heads; can accommodate trays of unlimited numbers of lip thicknesses; is quickly adjusted to receive trays of any lip thickness and which can be adjusted without shutting down the conveyorized food processing line.

Other objects, improved features and advantages of the invention will become apparent from a study of the detailed descriptions of the preferred embodiments described herein and illustrated in the accompanying drawings in which:

FIG. 1 is an elevational view of a prior art screw type tray dispenser head;

FIG. 3 is a plan view of the preferred embodiment of the invention shown in FIG. 2;

FIG. 4 is an elevational view taken along the line 4—4 of FIG. 2;

FIG. 5 is a plan view partially in section of FIG. 4;

FIG. 6 is an elevational view taken along line 6—6 of FIG. 5;

DETAILED DESCRIPTION OF THE INVENTION

Figure 2:
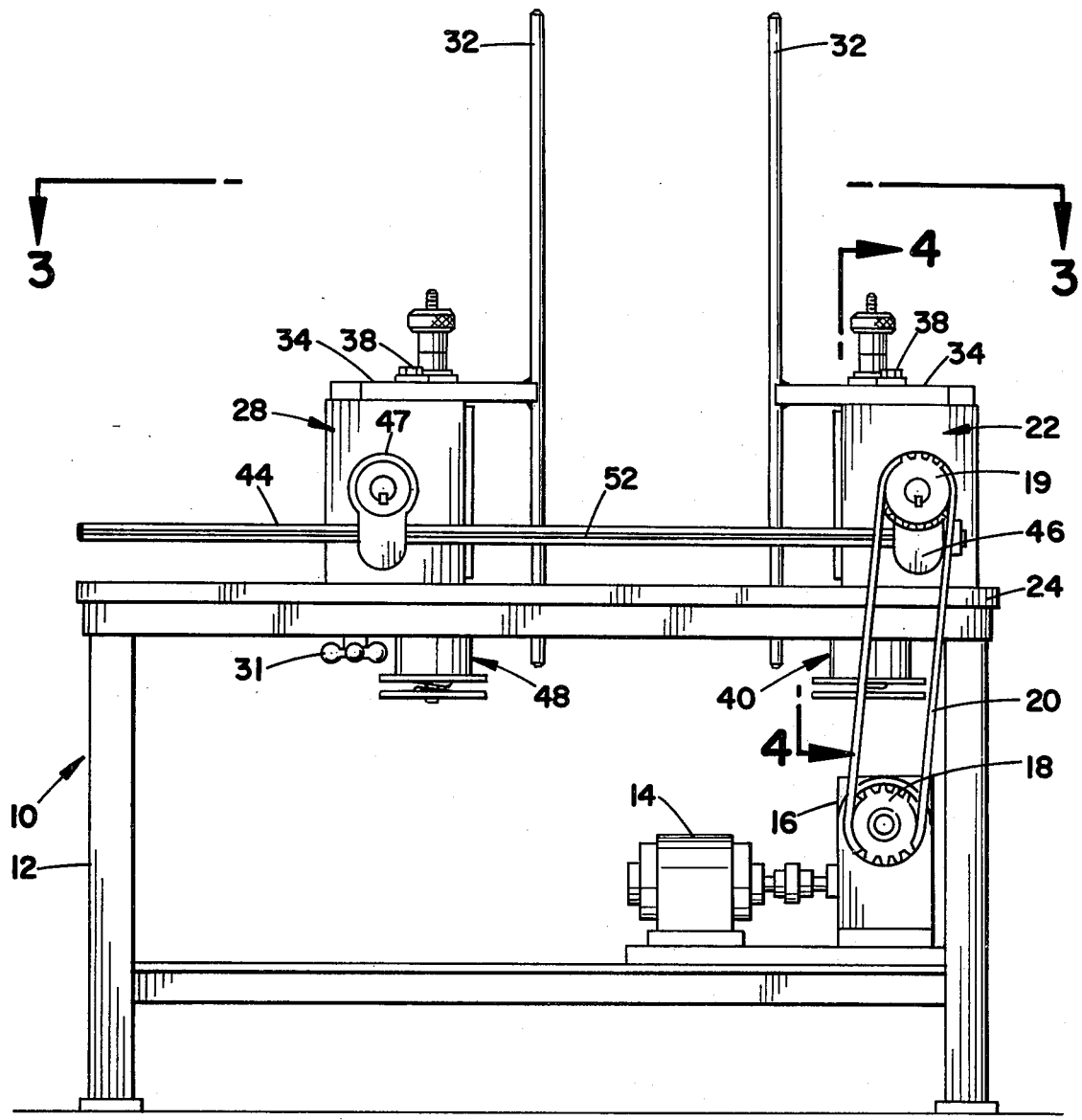
FIG. 2 is an elevational view of a preferred embodiment of the invention.

Reference is now made to FIGS. 2 and 3 wherein are shown elevational and plan views of a preferred embodiment 10 of the invention. A frame 12 supports a drive motor 14 and a gear box 16 which is drivingly connected to gear box sprockets 18 and 19 by means of drive chain 20. Gear box 22 is supported on a pair of gear box support plates 24 and 26. A second gear box 28 is also mounted on gear box support plates 24 and 26 and is positioned over adjusting slots 30. Hand knobs 31 secure gear box 28 to support plates 24 and 26 through slots 30. When loosened, hand knobs 31 permit gear box 28 to be shifted either to the right or to the left relative to gear box 22, depending on the size of trays required to be dispensed from the tray stack support rods 32. Support rods 32 are universally adjustable in any horizontal direction by means of support rod adjusting bars 34. It will be noted that each adjusting bar 34 is provided with an adjusting slot 36 which provides for the universal horizontal shifting of rods 32 upon loosening of cap screws 38. Sprocket 19 rotates a drive shaft in gear box 22 which in turn rotates tray dispenser heads 40 and 42, as will be described more fully hereinafter. Sprocket 19 also, by means of gear box 46, rotates drive shaft 44. Gear box 47 by gear means, translates the rotation of drive shaft 44 to drive a shaft in gear box 28 which rotates tray dispenser heads 48 and 50. It will be noted that drive shaft 44 is provided with a keyway 52 substantially along its entire longitudinal axis so that gear box 28 may be driven at any position along adjustment slots 30 of gear box support plates 24 and 26.

Referring to FIGS. 4, 5 and 6, it will be seen that sprocket 19 sequentially drives the gears in gear box 46 drive shaft 54, gears 56, 58, 60 and 62, and tubular shafts 64 and 66 respectively.

Figure 7:
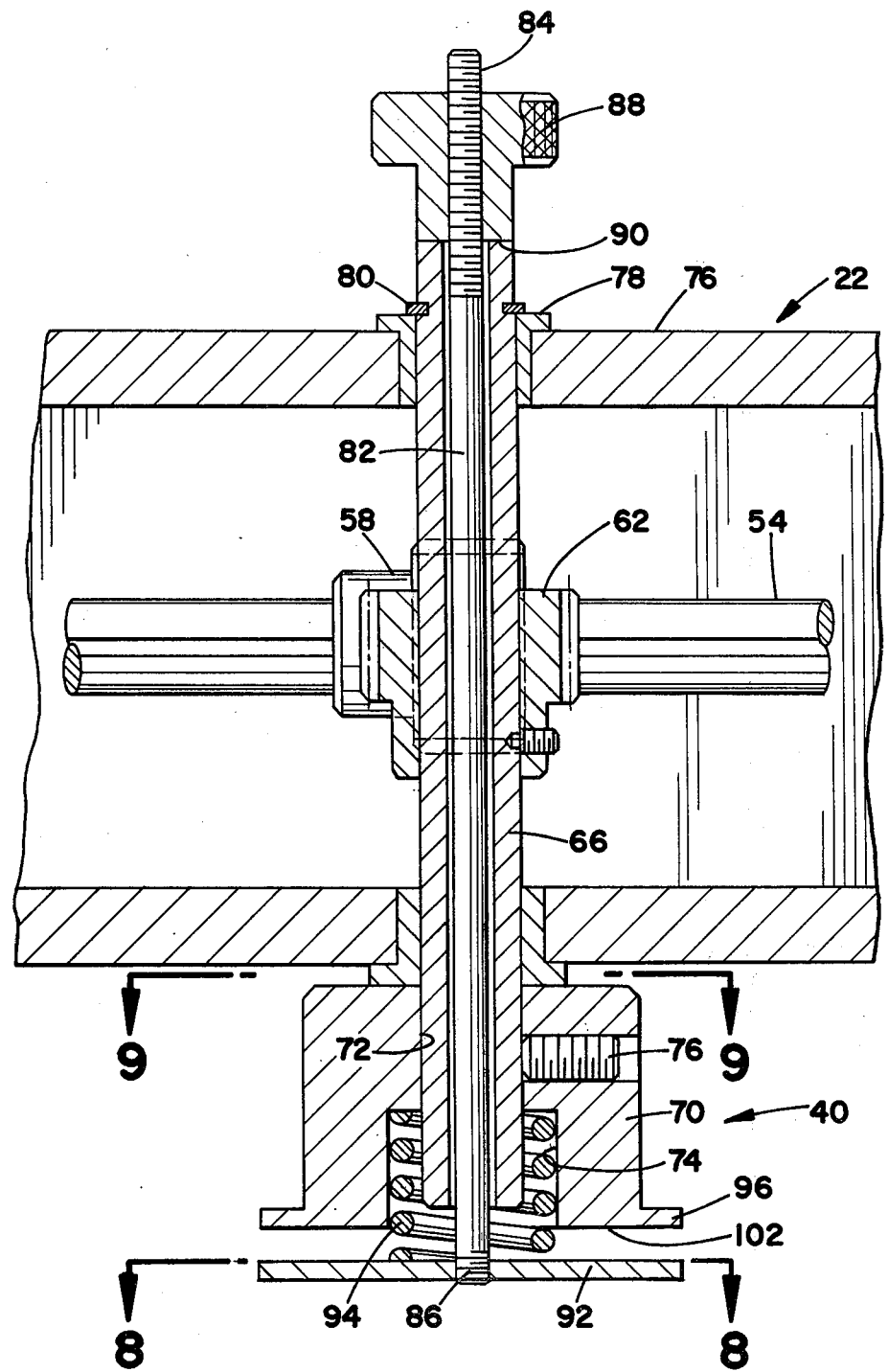
FIG. 7 is an elevational view in section of a preferred embodiment of the tray dispenser taken along the line 7—7 of FIG. 5.

Referring to FIG. 7, therein is shown in section a tray dispensing head 40 comprising a cylindrical block 70 having a vertical minor bore 72 in communication with a major vertical bore 74. The tubular shaft 66 is received within the minor bore 72 and extends downwardly into major bore 74. Tubular shaft 66 is secured for rotation with the cylindrical block 70 by means of set screw 76. The tubular shaft 66 also projects upwardly through the top plate 76 of gear box 22 and is secured thereto by bushing 78 and spring clip 80.

A rod 82, threaded at opposite ends 84 and 86, is fitted concentrically within tubular shaft 66. The upper threaded end 84 has a knurled adjusting knob 88 threaded thereon to make abutting contact with the upper edge 90 of tubular shaft 66. The lower threaded end 86 of rod 82 is threadedly engaged with tray dispensing disc 92. A helical spring 94 is received within major bore 74 to bias tray dispensing disc 92 downwardly away from cylindrical block 70. Spring 94 also holds adjusting knob 88 in firm bearing contact with surface 90 of tubular shaft 66. It will be apparent, therefore, that clockwise rotation of adjusting knob 88, as viewed in FIG. 5, will compress coil spring 94 to draw tray dispensing disc 92 closer to cylindrical block 70, or, upon counterclockwise rotation of adjusting knob 88, tray dispensing disc 92 may be shifted downwardly away from cylindrical block 70. A tray separator blade 96 is machined to project horizontally from the lower surface of cylindrical block 70.

Figure 8:
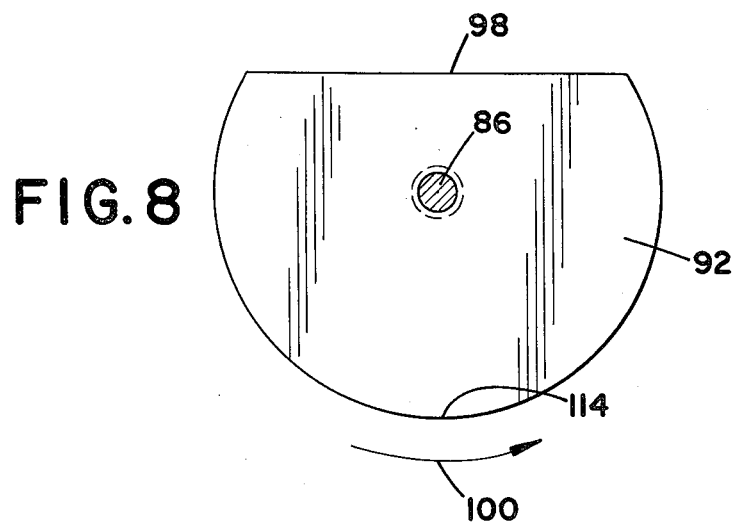
FIG. 8 is a plan view taken along the line 8—8 of FIG. 7.
Figure 9:
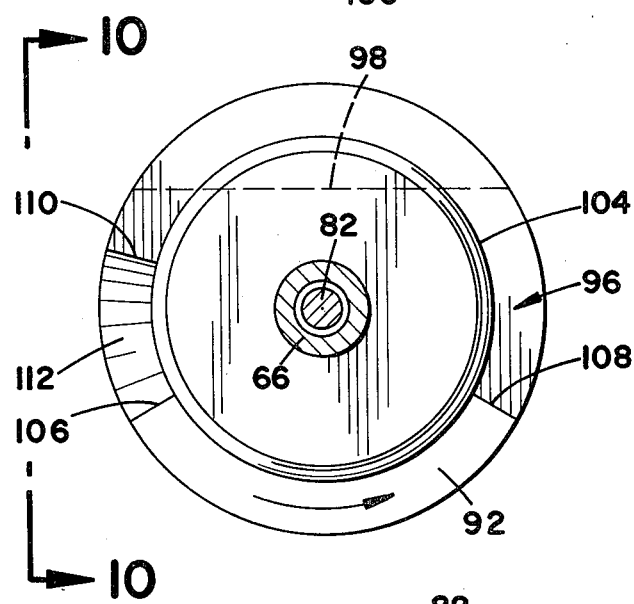
FIG. 9 is a plan view taken along the line 9—9 of FIG. 7.
Figure 10:
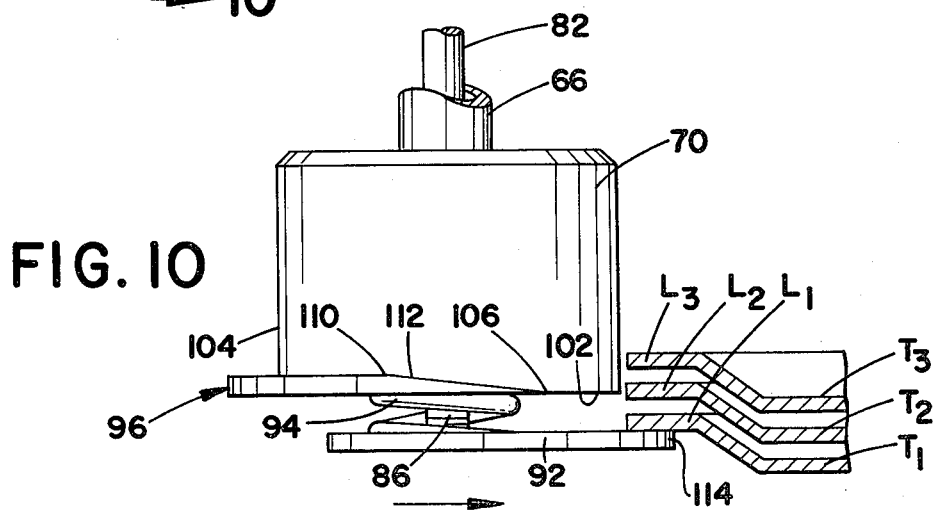
FIG. 10 is a fragmentary elevational view taken along the line 10—10 of FIG. 9.

FIGS. 8, 9 and 10 will now be discussed in conjunction with the function of dispensing head 40. Referring first to FIG. 8, it will be seen that bottom tray dispensing disc 92 is substantially circular in configuration but is truncated along edge 98. As indicated by arrow 100, this disc rotates in a counterclockwise direction. Tray dispensing blade 96 comprises a partially circular horizontal flange extension of bottom surface 102. Blade 96 passes arcuately about the periphery 104 of cylindrical block 70, starting with leading edge 106, 240° to trailing edge 108. A portion of blade 96, from leading edge 106 to intermediate edge 110, is an inclined plane 112, as best shown in FIG. 10, to form a tray lip separating wedge.

For purposes of explanation, assume that FIG. 10 represents a position of rest of dispensing head 40 before the tray dropper is actuated. It will be seen that a stack of trays T1, T2 and T3 are provided with lips L1, L2 and L3 respectively. It will be particularly noted that lip L1 is resting upon the circular periphery 114 of bottom tray dispensing disc 92. It will also be observed that leading edge 106 of wedge surface 112 makes no contact with the stacked trays at this time.

Figure 11:
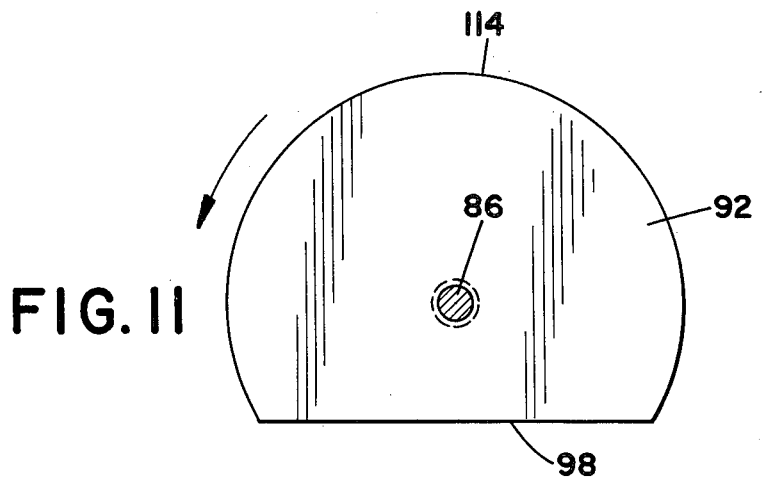
FIG. 11 is a plan view similar to FIG. 8 but rotated 180°.
Figure 12:
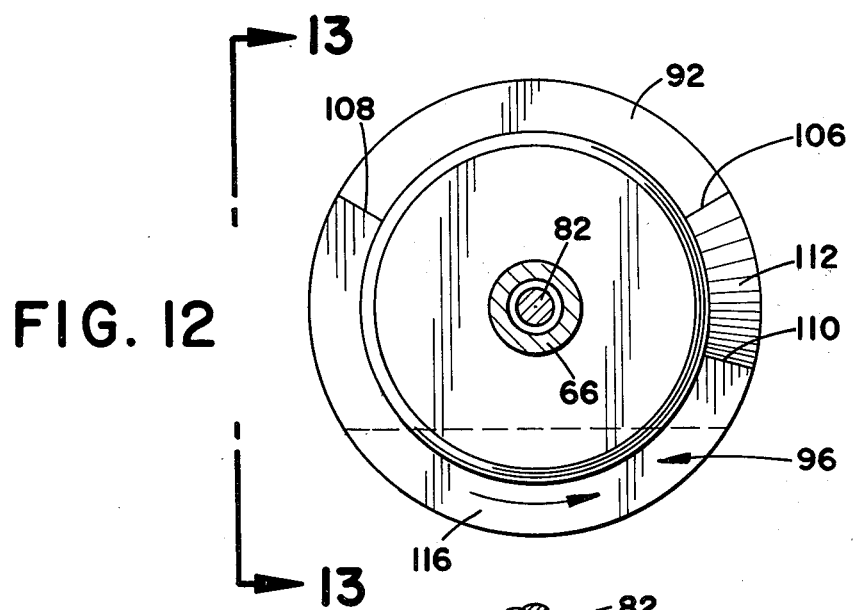
FIG. 12 is a plan view similar to FIG. 9 but rotated 180°.
Figure 13:
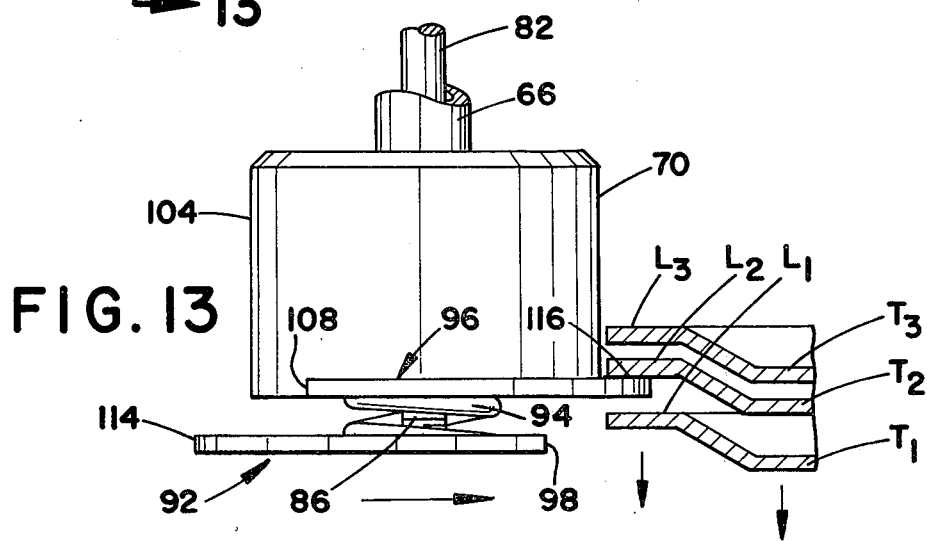
FIG. 13 is a fragmentary elevational view, taken along the line 13—13 of FIG. 12, similar to FIG. 10 but rotated 180°.

Referring now to FIGS. 11, 12 and 13, it may be assumed that the tray dropper has been actuated and that dispenser head 40 has been rotated 180°. It will be seen, from observing FIGS. 11, 12 and 13, that periphery 114 of disc 92 has been rotated out of engagement with the underside of lip L1 of tray T1. Accordingly, tray T1 is free to drop by gravity to a conveyor where further processing will occur. It will also be noted, that the underside of lip L2 of tray T2 has been wedged upwardly by wedge surface 112 of blade 96 and is now supported by the upper surface 116 of tray separator blade 96. Upon another 180° revolution of bottom disc 92 and blade 96, the outer periphery 114 of bottom plate 92 will now support the under surface of lip L2, similar to lip L1 of FIG. 10, prior to separation of lip L2 from lip L3 by wedge 112 of blade 96.

In the manner described, by rotation of dispensing head 40, a bottom tray is separated from the stack of trays every revolution of the dispensing head. It will also be observed that the thickness of the lips L1, L2 and L3 may be readily accommodated between bottom disc 92 and blade 96 by simple rotational adjustment of knurled adjusting knob 88. Thus, if a series of lips should run oversize or undersize it is not necessary to shut down the food processing line to adjust for this unexpected thickness inasmuch as a simple adjustment of knurled adjusting knob 86 will quickly make the necessary accommodation to a change in thickness of the lips.

It has been found that by rotating dispensing heads 40 and 42 so that discs 92 and blades 96 first engage a tray lip near the lips center and then rotate outwardly toward the corners of the tray, fewer tray mis-feeds occur. To rotate heads 40 and 42 so as to first engage a tray lip close to the corners of a tray, mis-feeds are more likely to occur because of excess tray material which overlaps at the tray corners, causing hang-ups. Thus, as shown in FIG. 3, dispensing heads 42 and 48 rotate clockwise and dispensing heads 40 and 50 rotate counterclockwise. It will also be understood that whereas four dispensing heads are shown in the preferred embodiment of the invention, there are certain circumstances in which other numbers of dispensing heads may be more efficiently utilized. Thus, for instance, it is conceivable that with certain types of trays only two dispensing heads are required, and whereas with other types of trays three to six dispensing heads may be required. However, for most sizes of trays presently being commercially utilized, it has been found that the use of four dispensing heads is the most useful embodiment of the invention.

As apparent from the foregoing description, a tray dropper is provided which is quickly and accurately adjusted to accommodate all known sizes of trays presently in commercial use, and this adjustment does not require the skilled services of a set-up man. Unskilled labor with the briefest of indoctrination can be taught to make the necessary adjustments to keep the tray dropper operating efficiently without interruption. It will be further understood that the above described embodiments of the invention have been set forth for the purpose of illustration only. Additional embodiments, modifications and improvements can be readily anticipated by those skilled in the art based on a reading and study of the present disclosure. Such additional embodiments, modifications and improvements may be fairly presumed to be within the spirit, scope and purview of the invention as defined by the subtended claims.

Having thus described the invention, it is claimed:

1. In a gravity tray dropper having a frame, a tray storage rack vertically mounted on said frame, and tray dispenser means mounted on opposite sides of said tray storage rack adapted to separate a tray from a stack of nesting trays placed in said storage rack, the improvement in said dispenser means comprising: a cylindrical block having a minor bore and a major bore concentrically and axially aligned and in communication one bore with the other; a tubular housing adapted to fit within said minor bore and to extend upwardly beyond said cylindrical block; a rod adapted to fit within said tubular housing and to extend upwardly beyond said tubular housing and downwardly beyond said tubular block, said rod being threaded at its opposite ends; an adjusting knob threadedly engaging the upper end of said rod; a truncated disc concentric with said rod and threadedly received on the lower end of said rod; spring means received within said major bore and adapted to provide pressure engagement between said cylindrical block and said truncated disc; a lip extending horizontally from the lower edge of said cylindrical block and positioned arcuately away from the truncated portion of said disc; means to secure said tubular housing to said cylindrical block for rotation therewith; and means to rotate said tubular housing; wherein rotation of said adjusting knob will vary the vertical space between said truncated disc and said lip.

2. The device of claim 1, including second dispenser means mounted adjacent to said first described dispenser means; and means to oppositely rotate said first and second dispenser means to first engage the lip of a tray at its center portion.

3. The device of claim 1, wherein said lip is positioned for rotation to cause its leading edge to engage the underside of the lip of a tray and to thereby separate said tray from an adjacent nesting tray and to drop the edge of said tray on said truncated disc; and wherein further rotation of said truncated disc revolves the disc from under said tray edge to permit said tray to drop free of said dispenser when said truncated portion comes into alignment with said tray.

4. The device of claim 1, including pairs of dispenser means on opposite sides of said tray storage rack, a first pair rotating clockwise and counterclockwise respectively and a second pair rotating clockwise and counterclockwise respectively.

5. The device of claim 1, including means to shift said oppositely mounted dispenser means toward and away from each other to accommodate trays of various sizes.

6. The device of claim 1, wherein said tray storage rack comprises vertically mounted rods universally adjustable in horizontal directions.

7. The device of claim 1, wherein said lip comprises a horizontally projecting truncated tray platform coplanar with the bottom surface of said cylindrical block and extending partially around the cylindrical surface of said cylindrical block having a wedge shaped leading edge arcuately spaced apart from its coplanar trailing edge, the space between said leading and trailing edges being arcuately shifted from the truncated portion of said disc, whereby said wedge shaped leading edge may be rotated to separate a bottom tray from a stack of nesting trays and to cause said tray to gravity drop onto said disc and whereupon rotation thereafter of said disc permits said tray to gravity drop free of said storage rack when said truncated portion of said disc is aligned with the adjacent edge of said tray.

8. In a rotary gravity feed tray dropper having a frame, a tray storage rack mounted on said frame, and dispenser means mounted on opposite sides of said tray storage rack adapted to separate a bottom tray from a stack of nesting trays placed in said storage rack, the improvement in said dispenser means comprising:

a shaft concentrically fitted within a tubular housing and adapted to project from opposite ends of said tubular housing;

a hand knob threadedly engaging said one end of said shaft;

a truncated disc secured to the other end of said shaft;

a wedge positioned between said tubular housing and said truncated disc and secured to said tubular housing for rotation therewith;

said wedge being arcuately positioned away from the truncated portion of said disc;

resilient means to bias said disc vertically away from said wedge;

said hand knob being rotatable to adjust the vertical space between said wedge and said disc;

and means to concentrically rotate said wedge and said disc in unison whereby trays having edges of different lip thicknesses may be readily accommodated between said wedge and said disc by adjustment of said hand knob.

9. In a rotary gravity feed tray dropper having a frame, a tray storage rack mounted on said frame, and dispenser means mounted on opposite sides of said tray storage rack adapted to separate a bottom tray from a stack of nesting trays placed in said storage rack, the improvement in said dispenser means comprising:

a shaft concentrically fitted within a tubular housing and adapted to project from opposite ends of said tubular housing;

a hand knob threadedly engaging said one end of said shaft;

a truncated disc secured to the other end of said shaft;

a wedge positioned between said tubular housing and said truncated disc and secured to said tubular housing for rotation therewith;

said wedge being arcuately positioned away from the truncated portion of said disc;

resilient means to bias said disc vertically away from said wedge comprising a spring in compression between said wedge and said truncated disc;

and means to concentrically rotate said wedge and disc in unison, whereby trays having edges of different lip thicknesses may be readily accommodated between said wedge and said disc by adjustment of said knob.

* * * * *